United States Patent [19]

Langrod

[11] 3,806,565

[45] Apr. 23, 1974

[54] METHOD OF PREPARING RELATIVELY LOW DENSITY OXIDE FUEL FOR A NUCLEAR REACTOR

[75] Inventor: Kasimir Langrod, Laguna Hills, Calif.

[73] Assignee: North American Rockwell Corporation, El Sequndo, Calif.

[22] Filed: Aug. 2, 1971

[21] Appl. No.: 168,453

[52] U.S. Cl................... 264/0.5, 423/261, 423/251, 423/252, 176/66, 176/89
[51] Int. Cl..... G21c 3/04, G21c 21/02, C01g 43/02
[58] Field of Search ........ 264/0.5; 23/355; 423/261, 423/251–52; 176/66, 89

[56] References Cited
UNITED STATES PATENTS

| 3,094,377 | 6/1963 | Langrod | 23/355 |
| 3,309,322 | 3/1967 | Anselin et al. | 264/0.5 |
| 3,288,595 | 11/1966 | Reichard | 23/355 |
| 3,504,058 | 3/1970 | Masselot | 264/0.5 |
| 3,189,666 | 6/1965 | Levey, Jr. et al. | 23/355 X |
| 3,371,133 | 2/1968 | Nishijima et al. | 264/0.5 |
| 3,161,701 | 12/1964 | Johnson et al. | 264/0.5 |
| 3,462,371 | 8/1969 | Robertson | 23/355 |
| 3,275,564 | 9/1966 | Pascard | 264/0.5 |

Primary Examiner—Carl D. Quarforth
Assistant Examiner—Roger S. Gaither
Attorney, Agent, or Firm—L. Lee Humphries; Henry Kolin; D. Douglas Price

[57] ABSTRACT

A method of preparing an oxide fuel for a nuclear reactor in which uranium dioxide powder or an intimate mixture of uranium dioxide and plutonium dioxide or thorium dioxide powders is sintered, the sintered material is comminuted to a fine powder, the fine powder is compacted by cold pressing and the compact is resintered at approximately the same temperature used for the first sintering.

8 Claims, No Drawings

METHOD OF PREPARING RELATIVELY LOW DENSITY OXIDE FUEL FOR A NUCLEAR REACTOR

BACKGROUND OF THE INVENTION

This invention relates to a method of preparing an oxide fuel for a nuclear reactor. More particularly, the invention relates to a method of preparing a relatively low density oxide fuel.

Ceramic materials such as uranium dioxide have been suggested for use in nuclear reactors because of their good corrosion resistance, high fusion point and stability under oxidizing conditions. Ceramic fuels have been fabricated by cold pressing and sintering, isostatic pressing, warm pressing, hot pressing, slip casting, wet extrusion, swaging and hot extrusion.

In cold pressing and sintering fabrication, oxide powders are cold pressed to place the particles in more intimate contact with each other and to reduce the void volume. The compact is then sintered at a temperature below the fusion point of the oxide powders.

In a typical cold pressing and sintering fabrication operation, uranium dioxide particles, prepared by the calcination of ammonium diuranate at 760°C under reducing conditions, are compacted in hydraulic presses to produce cylinders ranging in diameter from 0.3 to 0.5 inch and in length from 0.5 to 1.0 inch. The pellets are sintered for 4 hours at 1600°C. The pellets then pass through a centerless grinder which produces the final pellet.

Relatively low density ceramic fuels are preferred for use in some nuclear applications and in particular for use in fast breeder reactors. Several methods have been suggested for obtaining this low density. According to one method, the cold pressed pellets are intentionally under-fired on sintering. However, compacts or pellets which are not fully sintered will continue to shrink and densify in reactor use. Additionally, density control is extremely difficult because densification during sintering proceeds very rapidly. Another suggested approach is to lower the compacting pressure. However, low compacting pressures result in correspondingly increased shrinkage, making dimensional tolerances harder to maintain and increasing the amount of variation in diameter between the center and ends of the pellet (hour-glassing). A further approach consists in adding volatile organic material to the powder mixture prior to cold pressing and sintering. This volatile material burns out or sublimes on sintering and the escaping gases form a porous pellet. This method suffers in practice from the difficulty in controlling the size, shape and uniformity of the porosity.

SUMMARY OF THE INVENTION

Accordingly, it is an object of the present invention to provide an efficient method of preparing oxide fuel for a nuclear reactor. A further object is the provision of a method of preparing relatively low density oxide fuel in which the sintered density and shrinkage of the fuel can be controlled, close pellet dimensional tolerances can be maintained and centerless grinding can be eliminated.

In accordance with this invention, a ceramic fuel preparation method is provided comprising sintering uranium dioxide powder or an intimate mixture of uranium dioxide and plutonium dioxide or thorium dioxide powders, comminuting the sintered body to form a fine powder, compacting the fine powder by cold pressing and then resintering the compact at approximately the same temperature used for the first sintering.

In the first step, loose oxide powder is heated to the desired sintering temperature, usually 1400° to 1750°C, for a sufficient length of time to fully fire the composition. The sintered material is pulverized, usually by crushing, sizing and fine grinding, to form a fine powder, usually in the range of about 2 to 10 microns in size. In the compaction step, the finely ground powder from the first sintering operation is formed into free-flowing granules by either dry granulation or wet granulation. In the case of dry granulation, the free-flowing granules are slugged, typically at a pressure between 20,000 and 100,000 psi, followed by crushing to the size of granule desired. In the case of wet granulation in which a solution of the binder is employed, the wet agglomeration is dried, followed by crushing to the size of granule desired. The granules are then cold pressed, typically at a pressure between 20,000 and 100,000 psi. The compact is then sintered at approximately the same temperature used for the first sintering for a sufficient length of time to fully fire the composition.

DESCRIPTION OF THE PREFERRED EMBODIMENTS

The present invention is broadly directed to an improvement in the method of preparing oxide fuel for a nuclear reactor and particularly for preparing relatively low density oxide fuel. More particularly, the invention is directed to an improvement in the method of obtaining relatively low density uranium dioxide, plutonium dioxide-uranium dioxide and thorium dioxide-uranium dioxide ceramic fuels. In general, this method comprises sintering uranium dioxide powder or intimately mixed uranium dioxide and plutonium dioxide or thorium dioxide powders, comminuting the sintered body to a fine powder, compacting the fine powder by cold pressing and sintering the compact at approximately the same temperature used for the first sintering.

STARTING MATERIALS

The starting materials are powders of substantially the same size and grade as used in conventional cold pressing and sintering fabrication operations. The powders must be of high purity and care must be taken so that processing vessels do not introduce undesirable impurities. Suitable powders are conventionally referred to as "ceramic grade" or as "reactor grade." The oxide starting materials will typically have a particle size between about 0.1 and 5 microns. The starting materials should be dry and should be sized to remove excessively large agglomerates. For example, in the case of uranium dioxide, the powder is typically sized to pass No. 20 U. S. screen.

The uranium dioxide powder may be virgin material or may be prepared in a conventional manner, for example, by the reduction of uranyl oxalate. The molecular composition of the uranium dioxide is typically non-stoichiometric (.e.g, $UO_{2.08}$) but becomes stoichiometric ($UO_{2.00}$) on sintering. The plutonium dioxide and thorium dioxide powders may be prepared, for example, by thermally decomposing the oxalates, carbonates or hydroxides of the metals in a reducing atmosphere.

The uranium dioxide powder is intimately mixed with the plutonium dioxide or thorium dioxide powder in the proportion required in the finally sintered pellets. The exact proportion of oxides employed will depend on the nuclear reactor application contemplated; however, the oxides must be mixed in proportions which will result in solid solutions of the materials as is well known in the art. The plutonium dioxide-uranium dioxide fuel will typically contain between 15 and 30 weight percent plutonium dioxide. A typical thorium dioxide-uranium dioxide fuel would contain 2.5 to 10 weight percent uranium dioxide.

It has been found that good solid solutions cannot be formed is the mixed oxides are sintered separately and then blended. Accordingly, it is essential that the mixing operation precedes the first sintering operation. The mixing is accomplished in conventional manner, preferably by ball milling. The length of the ball milling operation, which is typically 8 to 24 hours, is not critical, as long as the oxide powders are well intermixed.

As illustrative of the necessity of intimately mixing the oxides prior to sintering in the preparation of mixed oxide ceramic fuels, 20 weight percent plutonium dioxide, which was derived from plutonium oxalate by calcination at 700°C, was mixed with 20 weight percent of unsintered virgin uranium dioxide and 60 weight percent of virgin uranium dioxide previously sintered at 1630°C. The mixed oxide mixture was sintered at 1630°C for 4 hours resulting in a composition containing approximately 60 weight percent of undissolved uranium dioxide. In comparison, 40 weight percent of plutonium dioxide, which was derived from plutonium oxalate calcined at 700°C, was mixed with 60 weight percent of virgin uranium dioxide and sintered at 1630°C for 4 hours. The resulting composition contained no detectable undissolved uranium dioxide. In further comparison, the sintered composition previously described containing 40 weight percent plutonium dioxide was mixed with an equal weight of virgin uranium dioxide and sintered at 1630°C for 4 hours resulting in a composition containing approximately 50 weight percent of undissolved uranium dioxide. The above described plutonium dioxide and uranium dioxide powders had an average particle size of about 0.6 micron and mixing was accomplished by ball milling for 20 hours.

POWDER SINTERING

Uranium dioxide powder or an intimate mixture of uranium dioxide and plutonium dioxide or thorium dioxide powders is heated in a reducing atmosphere to the sintering temperature to form a porous solid. The sintering of the loose mass of oxide powder is conducted at approximately the same temperature and for approximately the same length of time as the later compact sintering operation. Temperatures in the range of 1400° to 1750°C are typically employed; however, the temperatures in the range of 1600° to 1650°C are generally preferred. While sintering times of 2 to 8 hours will normally be employed, the lower the sintering temperature, the longer the sintering time to achieve equivalent powder densification. The reducing atmosphere is preferably a nonflammable one such as a 5 volume percent hydrogen-95 volume percent argon atmosphere.

COMMINUTION

The sintered body prepared in the powder sintering operation is crushed and sized to provide material which can be easily ground. The crushing is accomplished in conventional manner, typically in a steel mortar to pass No. 20 U. S.. screen. The grinding of the crushed material is also carried out in conventional manner, preferably by dry ball milling. The length of the ball milling operation is dependent upon the density of the sintered pellet desired. Generally speaking, the greater the reduction in particle size in the ball milling operation, the higher the density of the pellets after compact sintering. To obtain relatively low density fuels the ball milling operation will usually be conducted for a sufficient length of time to obtain a fine powder with a particle size of about 2 to 10 microns.

COMPACTING

In order to obtain uniform pellet density, the fine powder produced in the comminution operation is granulated to produce free-flowing granules prior to compacting. The granules may be formed, in conventional manner, by wet milling or by dry milling. In wet granulation, water and a small amount of organic binder, such as polyethylene glycol, are added to the finely ground metal oxide powder. The mixture is wet milled adn the water removed by drying, typically at 60° to 125°C. In dry granulation, the metal oxide powder is dry mixed with organic binder and the mixture is formed into shape by pressure, such as slugging at 20,000 to 100,000 psi and preferably at 40,000 to 80,000 psi. The amount of water added to the powder is typically ½ to 2 weight percent. Lubricant, such as zinc stearate, may be blended with the powder if required. After the granulation procedure is completed, the granules are sized to remove excessively large agglomerates and excessively small fines [e.g., −20 to +80 mesh (U. S. Standard)]. The granules are then compacted to shape by cold pressing, generally in the range of 20,000 to 100,000 psi and preferably in the range of 40,000 to 80,000 psi. This cold pressing provides a compact of sufficient "green" strength to allow firing without the compact breaking from internal stress. If desired, the compacts may be presintered, for example, by heating in a flowing carbon dioxide atmosphere to eliminate the possibility of sintering-furnace contamination by the organic binder or lubricant used for granulation.

COMPACT SINTERING

The cold pressed compacts are sintered to a dense solid, generally at 1400° to 1750°C for 2 to 8 hours. Generally speaking, the lower the sintering temperature employed, the longer the sintering time required to obtain a fully sintered composition. The preferred sintering temperature is about 1600° to 1650°C and the preferred sintering time is about 4 hours. This compact sintering operation is conducted at approximately the same temperature and for approximately the same length of time as the powder sintering step. The compact sintering is conducted in a reducing atmosphere and preferably a nonflammable one, such as a 5 volume percent hydrogen-95 volume percent argon atmosphere. As stated previously, while it is possible to underfire the composition to obtain relatively low density pellets, it is possible by the present fabrication technique to fully fire the compacts and still obtain relatively low densities, typically in the range of 80 to 95 percent theoretical density (T.D.), and additionally to obtain pellets with reduced shrinkage characteristics.

The present invention wil be particularly illustrated with respect to the preparation of ceramic plutonium dioxide-uranium dioxide fuel. Dry plutonium dioxide and uranium dioxide powder with an average particle size less than 1 micron was intimately mixed in the proportion of 25 weight percent plutonium dioxide and 75 percent uranium dioxide in a rubber-lined ball mill for 20 hours. The ball milled powder was heated in a molybdenum boat in a 5 volume percent hydrogen-95 volume percent argon atmosphere to 1630°C for 4 hours. The sintered body was crushed in a steel mortar and sized to pass No. 60 U. S. screen. The crushed and sized material was then ball milled for 8 hours to a particle size of 3.5 microns. The fine powder was dry mixed with ½ weight percent polyethylene glycol binder and slugged in a steel die at 80,000 psi. The slug was granulated by forcing it through No. 16 U. S. screen and fines of less than No. 100 U. S. screen mesh were screened out and repressed. The granulated powder was compacted at 50,000 psi into pellets ¼ inch long and ¼ inch in diameter. The compacts were sintered and the organic binder removed in one operation conducted at 1630°C for 4 hours in a 5 volume percent hydrogen-95 volume percent argon atmosphere. The "green" density of the cold pressed pellets before sintering and the sintered density of the pellets after compact sintering were 68.5 and 90.5 percent of the theoretical density, respectively, based on an average of 4 pellets.

The use of fully fired and comminuted oxide powder in conjunction with cold pressing and compact sintering has been found to decrease pellet shrinkage after compact sintering as well as to be useful in preparing relatively low density fuel. Generally speaking, the diameter shrinkage after compact sintering will be about ⅞ of the difference between the reciprocal of the "green" density of the cold pressed compacts and the reciprocal of the final sintered density. In the present fabrication technique this difference is markedly less than found in conventionally fabricated fuel pellets. For example, 15 percent shrinkage in diameter was found in pellets prepared by conventional technique from virgin uranium dioxide powder by cold pressing and sintering at 1630°C for 4 hours. In comparison, 20 weight percent plutonium dioxide-80 weight percent uranium dioxide pelets prepared in accordance with the present fabrication technique by powder and compact sintering at 1630°C for 4 hours were found, for an average of 5 pellets, to have a "green" density and a sintered density of 79.4 and 87.8 percent of theoretical density, respectively, and to experience a shrinkage in diameter after compact sintering of about 4 percent. In further comparison, mixed oxide pellets prepared by compact sintering (4 hours at 1630°C) a combination of 50 weight percent of unsintered, virgin uranium dioxide powder and 50 weight percent of sintered (4 hours at 1630°C), mixed oxide powder (20 weight percent plutonium dioxide-80 weight percent uranium dioxide) were found, for an average of 5 pellets, to have a "green" density and a sintered density of 67.7 and 87.3 percent of theoretical density, respectively, and to experience shrinkage in diameter after compact sintering of about 8 percent.

The sintered density and shrinkage of ceramic fuel pellets prepared in accordance with the present fabrication technique depend primarily on the particle size of the oxide powder subjected to cold pressing and compact sintering and, accordingly, depend primarily on the length of time that the material which has been subjected to powder sintering is ball milled. Compacting pressure has a less significant effect on the final sintered density and shrinkage. However, the morphology of the oxide powders used in the present fabrication technique is important. In other words, whether the oxide powders are, for example, oxalate or hydroxide derived will, in part, determine the final sintered density and shrinkage given the same fabrication conditions. The effect of ball milling time on final sintered density and shrinkage is illustrated in Table 1 for compositions containing 20 weight percent plutonium dioxide and 80 weight percent uranium dioxide.

TABLE 1

Final Sintered Density and Pellet Shrinkage vs. Ball Milling Time for 20/80 $PuO_2$-$UO_2$ Sintered at 1630°C for 4 Hours (Average of 5 Pellets Each)

| Ball Milling Time (hr.) | "Green" Density (% T. D.) | Sintered Density (% T. D.) | Pellet Diameter Shrinkage (%) |
|---|---|---|---|
| 5 | 78.5 | 81.4 | 1.6 |
| 10 | 78.6 | 83.7 | 3.0 |
| 15 | 77.4 | 87.9 | 5.0 |
| 20 | 75.4 | 93.2 | 8.2 |

Experimentation has shown that the sintered density and pellet shrinkage for separately processed batches of oxide powder from common lots of starting material are approximately the same for any given particle size of oxide powder subjected to cold pressing and compact sintering and that the relationship between sintered density or pellet shrinkage and particle size is essentially linear. Table 2 shows the result from two separately processed batches of oxide powder from two separate lots of starting material in which the batches were processed in the same manner. If the sintered densities for each of batches A and B from lot 1 or 2 is plotted against particle size, it will be seen that the sintered densities for each of the batches fall on essentially the same straight line. The same relationship will be found if pellet shrinkage is plotted against particle size. Consequently, the sintered density on pellet shrinkage of any given batch of oxide powder can be determined by establishing the slope of sintered density or pellet shrinkage versus particle size. This relationship has also been found to exist for reprocessed scrap pellets, including situations in which 100 percent of the starting material is reprocessed scrap.

TABLE 2

Particle Size vs. Final Sintered Density and Pellet Shrinkage For Batches of $PuO_2$—$UO_2$ from Common Lots (Average of 5 Pellets Each)

| Lot | Batch | Wt. % $PuO_2$-$UO_2$ | Average Particle Size (Microns) | "Green" Density (% T.D.) | Sintered Density (% T.D.) | Pellet diameter shrinkage (%) |
|---|---|---|---|---|---|---|
| 1 | A | 20/80 | 5.45 | 76.1 | 85.3 | 5.1 |
|   |   |   | 2.55 | 72.9 | 92.8 | 7.6 |
|   |   |   | 1.80 | 75.0 | 95.2 | 8.1 |
|   |   |   | 1.60 | 75.4 | 95.6 | 8.9 |
|   | B | 20/80 | 4.20 | 76.8 | 89.8 | 6.5 |
|   |   |   | 3.10 | 74.6 | 92.9 | 8.0 |
| 2 | A | 25/75 | 8.60 | 76.2 | 85.8 | 4.8 |
|   |   |   | 7.30 | 75.7 | 88.5 | 6.0 |

| | | 5.20 | 75.5 | 90.9 | 7.2 |
| --- | --- | --- | --- | --- | --- |
| B | 25/75 | 7.60 | 75.1 | 88.1 | 6.4 |
| | | 6.90 | 75.6 | 89.3 | 6.8 |

It will, of course, be realized that many variations in fabrication techniques may be used in the practice of this invention, depending in part on the particular density of the ceramic fuel desired as well as the type of ceramic fuel required. Accordingly, this invention is not to be limited by the illustrative and specific embodiments thereof but its scope should be determined in accordance with the claims.

I claim:

1. A method of preparing an oxide nuclear fuel having a density in the range of about 80 to 95 percent of theoretical density comprising sintering a metal oxide powder selected from the group consisting of uranium dioxide, intimate mixtures of uranium dioxide and plutonium dioxide and intimate mixtures of uranium dioxide and thorium dioxide powders at a selected temperature in the range of about 1400° to 1750°C for a sufficient length of time to form a fully fired body, lower temperatures requiring longer sintering times, comminuting the so-formed fully fired body to form a fine powder of predetermined particle size in the range of about 2 to 10 microns, compacting only the fully fired fine powder of predetermined particle size to form a sinterable compact, and sintering the so-formed compact in the range of about 1400 to 1750°C to form said oxide nuclear fuel having said density in the range of about 80 to 95 percent of theoretical density.

2. The method of claim 1 in which the fine powder formed from the comminution of the fully fired body is compacted at a pressure of about 20,000 to 100,000 psi.

3. A method of preparing an oxide nuclear fuel having a density in the range of about 80 to 95 percent of theoretical density comprising sintering a metal oxide powder selected from the group consisting of uranium dioxide, intimate mixtures of uranium dioxide and plutonium dioxide and intimate mixtures of uranium dioxide and thorium dioxide powders at a temperature of about 1400° to 1750°C for about 2 to 8 hours in a reducing atmosphere to form a fully fired body, crushing, sizing and grinding the so-formed fully fired body to form a fine powder having a predetermined particle size of about 2 to 10 microns, compacting only the comminuted fully fired powder of predetermined particle size by cold pressing at a pressure of about 20,000 to 100,000 psi to form a sinterable compact, and sintering the so-formed cold-pressed compact at a temperature of about 1400° to 1750°C for about 2 to 8 hours in a reducing atmosphere to form said oxide nuclear fuel having said density in the range of about 80 to 95% of theoretical density.

4. The method of claim 3 in which the starting metal oxide powder subjected to powder sintering has a particle size of about 0.1 to 5 microns.

5. The method of claim 3 in which the fine powder formed from the fully fired comminuted body is granulated with an organic binder prior to being compacted.

6. The method of claim 5 in which the organic binder is dry mixed with said fine powder formed from the fully fired comminuted sintered body, and the granules are slugged at a pressure of about 20,000 to 100,000 psi prior to being compacted.

7. The method of claim 5 in which a solution of the organic binder is mixed with said fine powder formed from the fully fired comminuted sintered body, and the wet granules are dried prior to being compacted.

8. The method of claim 3 in which the intimate mixture of uranium dioxide and plutonium dioxide powders contains about 15 to 30 weight percent plutonium dioxide, and the finally formed nuclear oxide fuel consists of a complete solid solution of plutonium dioxide in uranium dioxide.

* * * * *

UNITED STATES PATENT AND TRADEMARK OFFICE
CERTIFICATE OF CORRECTION

PATENT NO. : 3,806,565
DATED : April 23, 1974
INVENTOR(S) : Kasimir Langrod

It is certified that error appears in the above-identified patent and that said Letters Patent are hereby corrected as shown below:

Front Page [73], "El Sequndo" should read --El Segundo--.

Column 3, line 14, "is" should read --if--.

Column 4, line 29, "adn" should read --and--; line 34, delete "water" and insert --binder--.

Column 5, line 11, after "75" insert --weight--; line 40, "7/8" should read --1/3--; line 50, "pelets" should read --pellets--.

Column 6, line 67, "75.7" should read --75.5--.

Signed and Sealed this

Twenty-fourth Day of August 1976

[SEAL]

Attest:

RUTH C. MASON
*Attesting Officer*

C. MARSHALL DANN
*Commissioner of Patents and Trademarks*